United States Patent
Wang et al.

[19]

[11] Patent Number: 6,084,904
[45] Date of Patent: Jul. 4, 2000

[54] METHOD AND APPARATUS FOR ADJUSTING A POWER CONTROL SETPOINT THRESHOLD IN A WIRELESS COMMUNICATION SYSTEM

[75] Inventors: Michael Mao Wang, Champaign; Fuyun Ling, Hoffman Estates; Robert T. Love, Barrington; Lee Michael Proctor, Cary, all of Ill.

[73] Assignee: Motorola, Inc., Schaumburg, Ill.

[21] Appl. No.: 08/900,269

[22] Filed: Jul. 25, 1997

[51] Int. Cl.[7] .................................................. H04B 15/00
[52] U.S. Cl. ........................ 375/130; 375/140; 375/148; 375/317; 370/335
[58] Field of Search ..................................... 375/200, 206, 375/130, 140, 317, 148, 219; 370/342, 252, 335; 455/69, 522, 38.3, 423

[56] References Cited

U.S. PATENT DOCUMENTS

| | | | |
|---|---|---|---|
| 5,216,692 | 6/1993 | Ling | 375/200 |
| 5,386,589 | 1/1995 | Kanai | 455/423 |
| 5,619,524 | 4/1997 | Ling et al. | 375/200 |
| 5,623,484 | 4/1997 | Muszynski | 370/335 |

*Primary Examiner*—Stephen Chin
*Assistant Examiner*—Shuwang Liu
*Attorney, Agent, or Firm*—Sayed Hossain Beladi

[57] ABSTRACT

A method of adjusting a power control setpoint threshold (216) in a wireless communication system is provided. The method includes the steps of receiving at a receiver, a communication signal from a mobile communication unit to form a received communication signal, generating a first signal quality indicator (193) based on the received communication signal, generating a second signal quality indicator (194) based on the received communication signal, and generating an estimated signal-to-noise ratio (98). The method further includes setting a predetermined reference region (605) centered around a second signal quality indicator reference (206) where the second signal quality indicator reference (206) is related to the first signal quality indicator (193), and adjusting the power control setpoint threshold (216) based on a comparison between the second quality indicator (194) and the predetermined reference region (605).

22 Claims, 5 Drawing Sheets

FIG.7
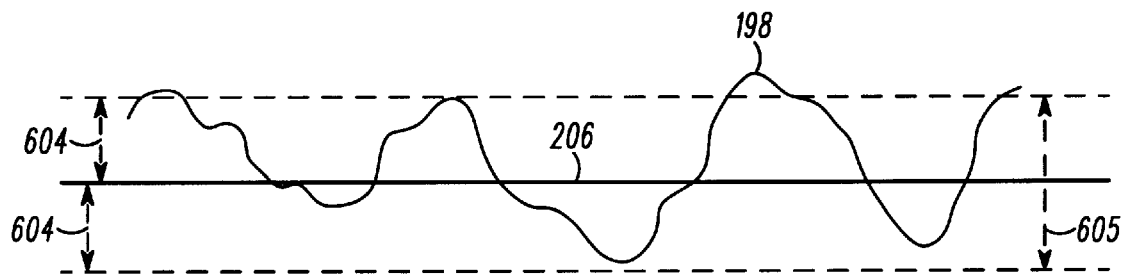
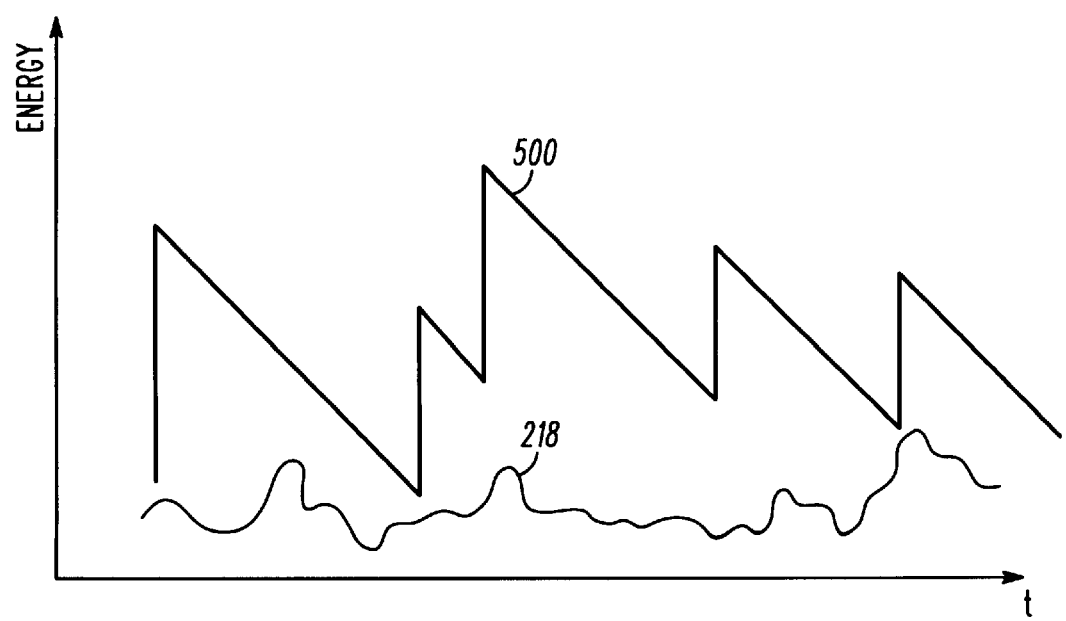
FIG.8

1

METHOD AND APPARATUS FOR ADJUSTING A POWER CONTROL SETPOINT THRESHOLD IN A WIRELESS COMMUNICATION SYSTEM

RELATED INVENTIONS

The present invention is related to "Method and Apparatus for Power Control in a Communication System", having Ser. No. 08/616,542 filed on Mar. 15, 1996, "Method and Apparatus for Rate Determination in a Communication System", having Ser. No. 08/672,155 filed on Jun. 27, 1996, and "Method and Apparatus for Power Control in a Communication System", having Ser. No. 08/616,797 filed on Mar. 15, 1996.

FIELD OF THE INVENTION

The present invention relates generally to wireless communication systems and, more particularly, to a method and apparatus for adjusting a power control setpoint threshold in a wireless communication system.

BACKGROUND OF THE INVENTION

Communication systems that utilize coded communication signals are known in the art. One such system is a direct sequence code division multiple access (DS-CDMA) cellular communication system, such as set forth in the Telecommunications Industry Association Interim Standard 95A (TIA/EIA IS-95A) herein after referred to as IS-95A. In accordance with IS-95A, the coded communication signals used in the DS-CDMA system comprise signals that are transmitted in a common 1.25 MHz bandwidth, hence, spread-spectrum, to base sites of the system from communication units, such as mobile or portable radiotelephones, that are communicating in the coverage areas of the base sites.

Communication systems that utilize coded communication signals are known to employ channel power control methods which control transmission energy of mobile communication units. Reverse-link (mobile communication unit to base site), power control varies the power transmitted by the mobile communication unit to ensure that the power from each mobile communication unit arrives at the base site at the minimum possible power level. If the mobile communication units' transmit power is too low, voice quality will be degraded. If the mobile communication units' power is too high, the mobile communication unit may have high quality voice, but because each mobile communication unit's signal in a spread-spectrum system is typically transmitted on the same frequency, the resulting excess interference will degrade the overall system capacity. The magnitude of noise, which is inversely proportional to bit energy per noise density i.e., Eb/No which is defined as the ratio of energy per information-bit to noise-spectral density, is directly related to the received signal power of each of the other mobile communication units' transmissions. Thus it is beneficial for a mobile communication unit to transmit at the lowest power level possible while maintaining the integrity of the signal, the integrity characterized by its frame erasure rate (FER).

It is also desirable to dynamically adjust the power of all mobile communication units in such a way that their transmissions are received by the base station with substantially the same power level. To accomplish this, it is necessary for the closest transmitters to reduce their power by as much as 80 dB when compared to the power of the furthest transmitters.

The current method of controlling reverse channel power in a CDMA communication system is described in Cellular System Remote Unit Base Station Compatibility Standard of the Electronic Industry Association Interim Standard 95A (TIA/IS-95A). As described in TIA/IS-95A, a power-control group is transmitted from the mobile communication unit and received by the base station. The base station compares the energy of the power-control group to a setpoint threshold and instructs the mobile communication unit to power up or down accordingly via transmitting a power adjustment command to the mobile communication unit. Under nominal conditions, utilizing such a closed loop power control method will result in a setpoint threshold which maintains the Eb/No of the received signal at a substantially fixed level. However, under varying conditions, for example, when a mobile station is moving at varying speeds, different Eb/No are required for a given FER. Thus maintaining a fixed Eb/No may result in different FERs for mobile stations under different conditions.

Therefore, a need exists for a method and apparatus for adjusting a power control setpoint threshold in a wireless communication system which adjusts the power level needs of the mobile communication system while decreasing the period of time over which the threshold adjustments occurs.

BRIEF DESCRIPTION OF THE DRAWINGS

FIG. 7 is an illustration of a second signal quality indicator reference, generated by outerloop setpoint controller in FIG. 6.

FIG. 8 is an illustration of a comparison between a power control setpoint threshold pattern, according to a preferred embodiment of the present invention and a prior art outerloop setpoint threshold pattern depicted in FIG. 5.

SUMMARY

A method of adjusting a power control setpoint threshold in a wireless communication system is provided. The method includes the steps of receiving at a receiver, a communication signal from a mobile communication unit to form a received communication signal, generating a first signal quality indicator based on the received communication signal, generating a second signal quality indicator based on the received communication signal, and generating an estimated signal-to-noise ratio. The method further includes setting a predetermined reference region centered around a second signal quality indicator reference where the second signal quality indicator reference is related to the first signal quality indicator, and adjusting the power control setpoint threshold based on a comparison between the second quality indicator and the predetermined reference region.

A controller responsive to a decoder is provided. Stated generally, the controller includes means for receiving a first signal quality indicator based on a decoded received communication signal, and means for receiving a second signal quality indicator based on the decoded received communication signal. The controller further includes means for generating a second signal quality indicator reference where the second signal quality indicator reference is related to the first signal quality indicator, means for setting a predetermined reference region centered around the second signal quality indicator reference, and means for adjusting a power control setpoint threshold based on a comparison between the second signal quality indicator and the predetermined reference region.

DETAILED DESCRIPTION OF PREFERRED EMBODIMENT

Figure 1:
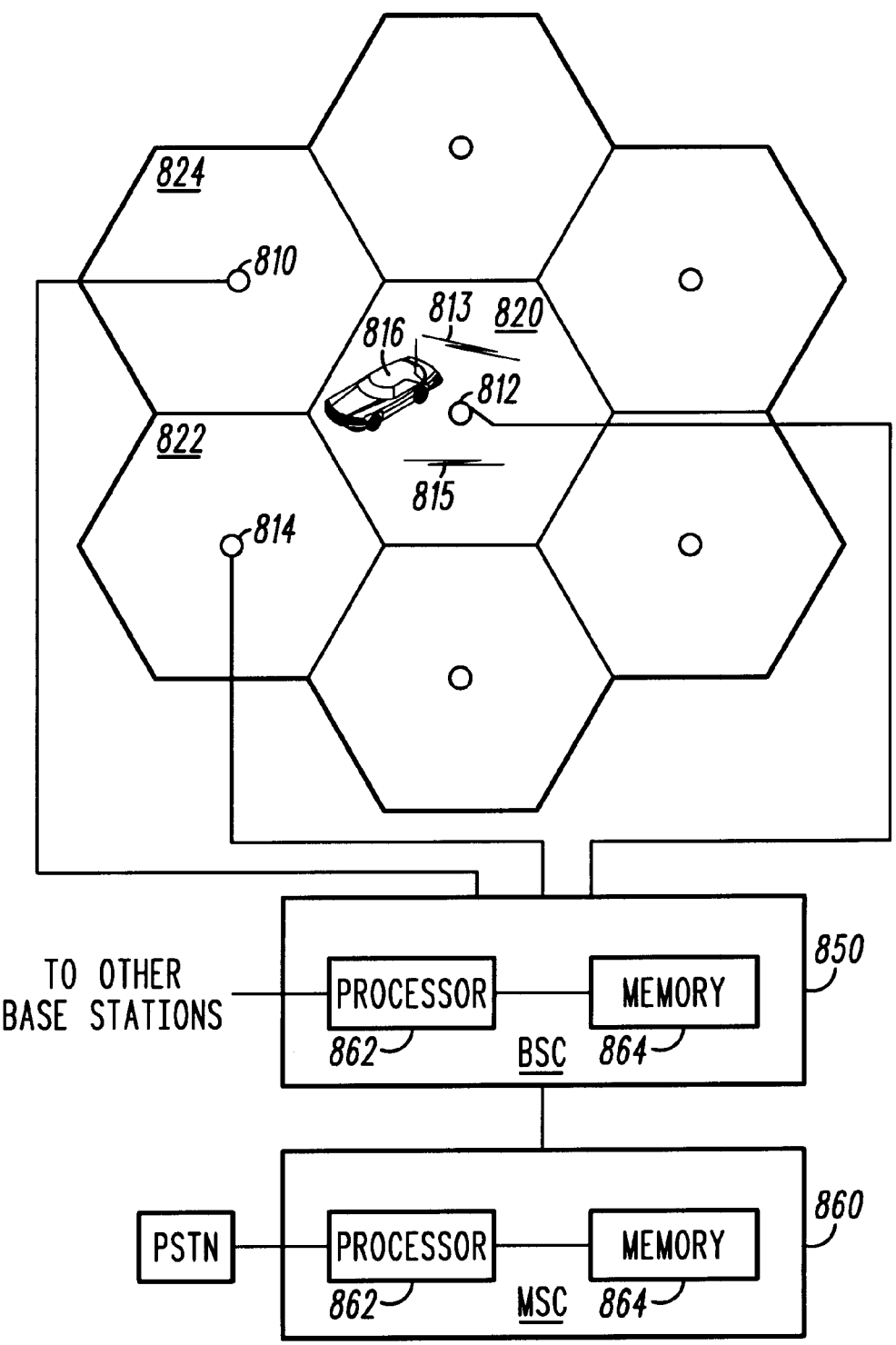
FIG. 1 is a block diagram of a typical wireless communication system.

Turning now to the drawings, wherein like numerals designate like components, FIG. 1 illustrates a wireless communication system 100, such as a code division multiple access (CDMA) digital radiotelephone system. Base stations 810, 812 and 814 communicate with a mobile station 816 operating within an area 820 served by base station 812. Areas 822 and 824 are served by base stations 814 and 810, respectively. Base stations 810, 812 and 814 are coupled to a centralized controller such as base station controller 850, which includes, among other things, a processor 862 and a memory 864, and which is in turn coupled to a mobile switching center 860, also including a processor 862 and a memory 864.

Multiple access wireless communication between base stations 810, 812 and 814 and mobile station 816 occurs via radio frequency (RF) channels which provide physical paths over which digital communication signals such as voice, data and video are transmitted. Base-to-mobile station communications are said to occur on a forward-link channel, while mobile-to-base station communications are referred to as being on a reverse-link channel. Additionally, mobile communication unit channel power control is accomplished on the reverse-link. A communication system using CDMA channelization is described in detail in TIA Interim Standard IS-95A, Mobile Station-Base Station Compatibility Standards for Dual-Mode Wideband Spread Spectrum Cellular Systems, Telecommunications Industry Association, Washington, D.C. July 1993 [IS-95A], and "TIA Telecommunications Systems Bulletin: Support for 14.4 kbps Data Rate and PCS Interaction for Wideband Spread Spectrum Cellular Systems", February 1996 [the Bulletin], both IS-95A and the Bulletin incorporated herein by reference.

As shown in FIG. 1, forward communication signal 813 has been transmitted on an IS-95 forward-link channel such as a Paging Channel or a Traffic Channel by base station 812 to mobile station 816. A reverse communication signal 815 has been transmitted via an IS-95 reverse-link channel such as an Access Channel or a Traffic Channel by mobile station 816 to base station 812.

In addition to data and voice, forward communication signal 813 carries a power control bit (PCB) which alters the transmission power of mobile station 816, via a feedback algorithm (discussed below), in response to Rayleigh/Rician fading, interference level variations (e.g. voice activity or loading), differences in transmit and receive antenna gains, and other associated losses. Transmit power of mobile station 816 is altered upon receipt of a transmitted PCB, multiplexed onto forward communication signal 813 at a source base station such as base station 812.

Figure 2:
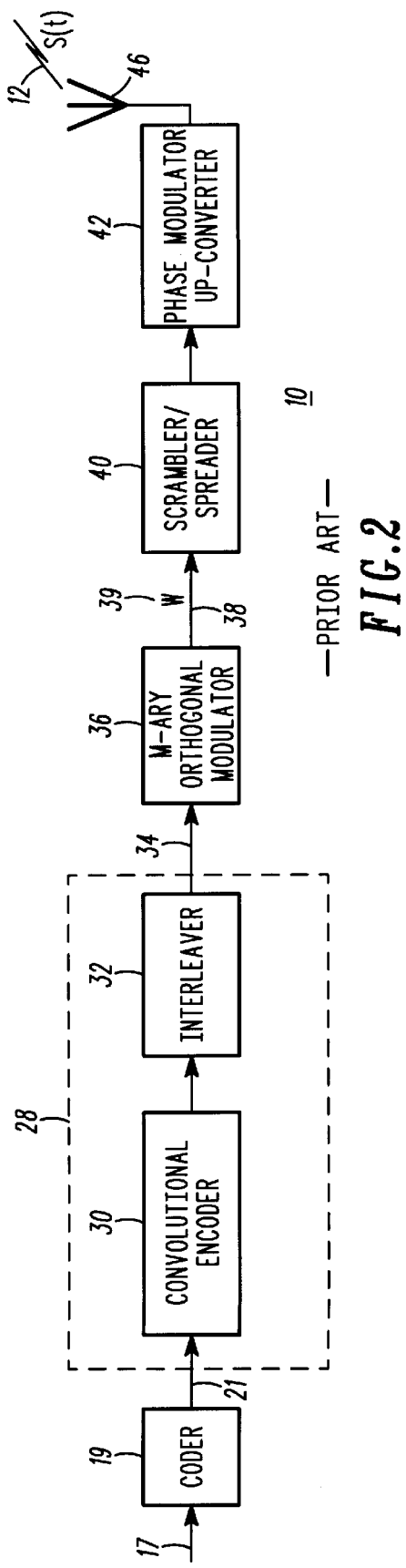
FIG. 2 is a block diagram of a prior art base station transmitter for generating a communication signal waveform.

FIG. 2 is a block diagram of a transmitter 10, for use in a mobile station such as mobile station 816, for generating reverse communication signal 815. A data bit stream 17, which may be voice, video or another type of information, enters a variable-rate coder 19, which produces a signal 21 comprised of a series of transmit channel frames having varying transmit data rates. The transmit data rate of each frame depends on the characteristics of data bit stream 17.

Encoder block 28 includes a convolutional encoder 30 and an interleaver 32. At convolutional encoder 30, transmit channel frame may be encoded by a rate ⅓ encoder using well-known algorithms such as convolutional encoding algorithms which facilitate subsequent decoding of the frames. Interleaver 32 operates to shuffle the contents of the frames using commonly-known techniques such as block interleaving techniques.

Figure 3:
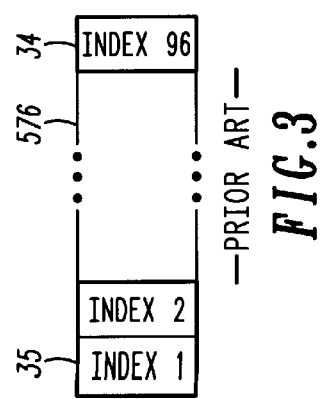
FIG. 3 is a diagram of a prior art digitally encoded and interleaved frame created by the transmitter depicted in FIG. 2.

As shown in FIG. 3, each frame 34 of digitally coded and interleaved bits includes ninety-six groups of six coded bits, for a total of 576 bits. Each group of six coded bits represents an index 35 to one of sixty-four symbols such as Walsh codes. A Walsh code corresponds to a single row or column of a sixty-four-by-sixty-four Hadamard matrix, a square matrix of bits with a dimension that is a power of two. Typically, the bits comprising a Walsh code are referred to as Walsh chips.

Referring again to FIG. 2, each of the ninety-six Walsh code indices 35 in frame 34 are input to an M-ary orthogonal modulator 36, which is preferably a sixty-four-ary orthogonal modulator. For each input Walsh code index 35, M-ary orthogonal modulator 36 generates at output 38 a corresponding sixty-four-bit Walsh code W 39. Thus, a series of ninety-six Walsh codes W 39 is generated for each frame 34 input to M-ary orthogonal modulator 36.

Scrambler/spreader block 40, among other things, applies a pseudorandom noise (PN) sequence to the series of Walsh codes W 39 using well-known scrambling techniques. At block 42, the scrambled series of Walsh codes W 39 is phase modulated using an offset quaternary phase-shift keying (OQPSK) modulation process or another modulation process, up-converted and transmitted as communication signal S(T) 12 from antenna 46.

Figure 4:
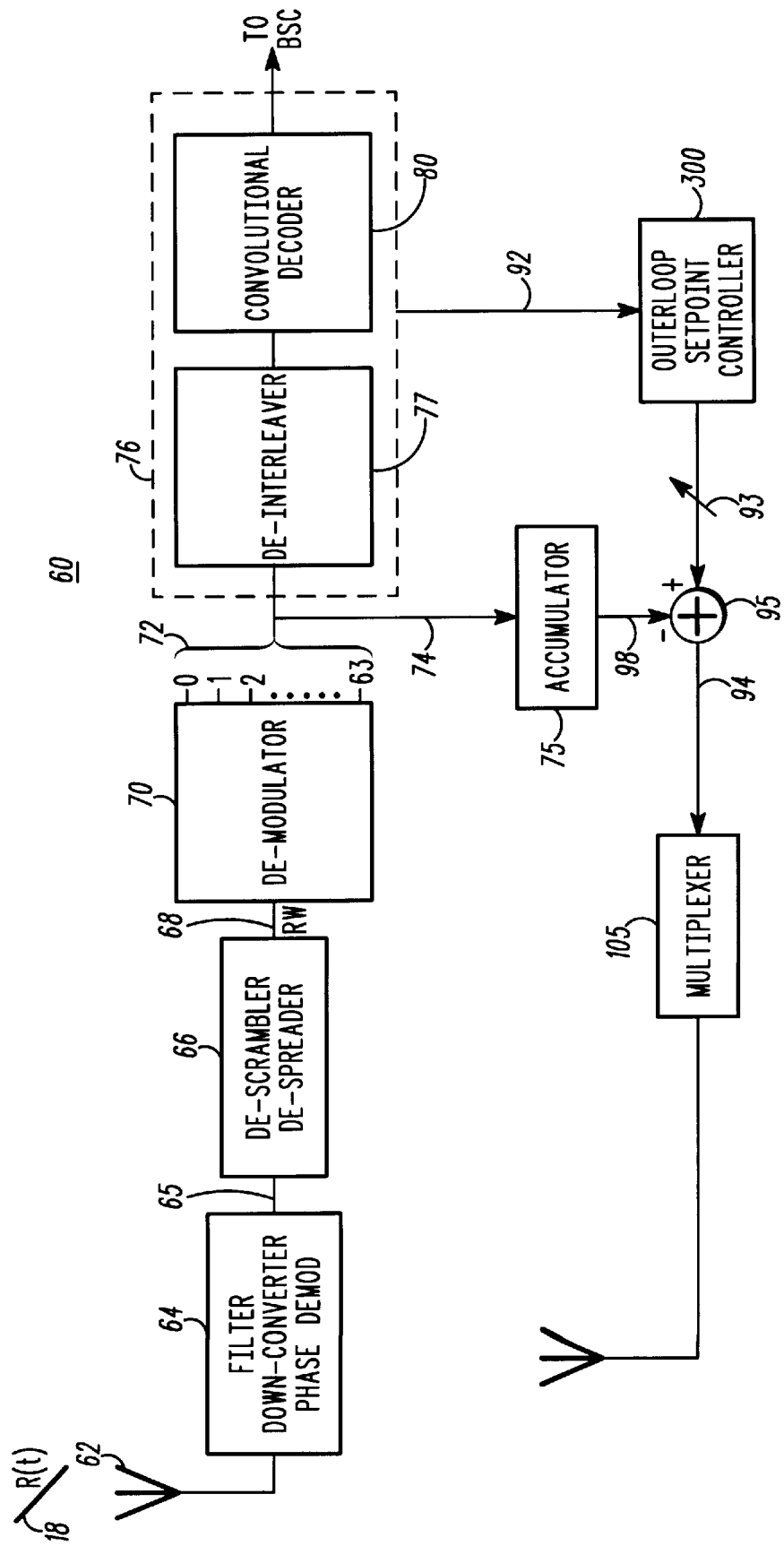
FIG. 4 is a partial block diagram of a receiver for receiving the communication signal waveform generated by the transmitter depicted in FIG. 2.

FIG. 4 is a partial block diagram of a receiver 60 within a base station such as base station 812 (shown in FIG. 1), for receiving a communication signal R(T) 18, originally transmitted by mobile station 816 as communication signal S(T) 12 (shown in FIG. 2). Communication signal S(T) 12 may be subject to multipath fading, path loss and shadowing thus, resulting in received communication signal R(T) 18. Receiver 60 is preferably a RAKE receiver having a number of fingers, although only a single finger is shown. Receiver 60 may be coherent, non-coherent or quasi-coherent.

Antenna 62 receives communication signal R(T) 18, which comprises a number of received frames. Front-end processing such as filtering, frequency down-converting and phase demodulation of communication signal R(T) 18 is performed by well-known methods and circuits at block 64.

A processed signal 65 from block 64 enters a de-scrambler/de-spreader block 66. De-scrambler/de-spreader block 66, among other things, removes the PN code applied by scrambler block 44 (shown in FIG. 2) to the series of Walsh codes W 39 (also shown in FIG. 2). In the IS-95 reverse-link channel, a received frame of received signal 18 includes ninety-six received symbols, or Walsh codes, which are each sixty-four bits long. The received Walsh codes have been altered during transmission by various channel parameters, however, and simply appear to receiver 60 to be received signal samples. Nevertheless, the received Walsh codes are referred to herein as received Walsh codes RW 68.

Referring again to FIG. 4, each received Walsh code RW 68, after leaving de-scrambler/de-spreader 66, is input to an orthogonal demodulator 70, such as a Fast Hadamard Transform (FHT). FHT 70 may be implemented using commercially available hardware as an array of adders or as a multiplexed adder, depending on its size. Alternatively, FHT 70 may be implemented utilizing a conventional digital signal processor (DSP) such as a Motorola DSP, part no. 56166 or an application specific integrated circuit (ASIC).

Upon receiving a received Walsh code RW 68, FHT 70 generates a number of output signals 72. Sixty-four output signals 72 are generated by FHT 70 per Walsh code RW 68. Each output signal 72 has an index which references one of the sixty-four possible Walsh codes W 39 generated by M-ary orthogonal modulator 36 (shown in FIG. 2). Thus, in the IS-95 reverse link channel, when a received Walsh code group RW 68 is input to FHT 70, sixty-four output signals 72 which correlate to sixty-four possible transmitted Walsh codes 39 are produced. It should be understood that in addition to having an index, each output signal 72 also has an associated complex number, C (not shown). Seven bits are preferably allocated to the real and imaginary portions, respectively, of the complex number, although fewer or more bits are possible. For simplicity, the index and the complex number will be referred to collectively as output signal 72.

Each output signal 72 further has an associated energy value, C2 (not shown) which may be referred to as a Walsh symbol energy value commonly calculated by magnitude-squaring the complex number C associated with output signal 72. Walsh symbol energy value C2 generally corresponds to a measure of confidence, or a likelihood, that output signal 72 indexes a Walsh code W 39 which corresponds to a group of received Walsh codes RW 68 input to FHT 70. The index of output signal 72 with the largest Walsh symbol energy value may be referred to as a winning Walsh index with an associated energy value referred to as a winning Walsh symbol energy value 74. Winning Walsh symbol energy value 74 may have any suitable bit width, and may be, for example, fourteen bits wide.

Acting on output signal 72, a decoder 76, which may include a de-interleaver 78 and a convolutional decoder 80, further demodulates received signal R(T) 18, estimating transmitted communication signal S(T) 12. Elements of decoder 76 are well known in the art and may be implemented in a variety of ways. After the demodulation process, a re-encoder (not shown), which may be substantially similar to encoder 28 shown in FIG. 2, may re-create the transmitted digitally coded and interleaved bits, depicted in FIG. 3. and forward them to BSC 850 for further processing according to methods well known in the art.

Referring again to FIG. 1, IS-95A specifies a servo-loop which detects signal energy variations and compensates for those variations by adjusting the transmission power of mobile station 816 using well known open loop power control algorithms as well as closed loop power control algorithms. Open loop power control, which is performed at mobile station 816 attempts to account for common or symmetrical losses experienced by reverse communication signal 815 and forward communication signal 813, due to path loss and shadowing. Closed loop power control, consisting of an inner loop and outer loop, is designed to compensate for fast (Rayleigh/Rician) fading experienced by the reverse communication signal 815 and for asymmetrical losses between the forward communication signal 813 and reverse communication signal 815. The inner loop is distributed between mobile station 816 and base station 812 and provides a feedback mechanism via sending power control bits (discussed below). The power control bits are sent by puncturing symbols on forward communication signal 813. The power control bits vary the transmission power of mobile station 816 to achieve the optimal signal to noise level at base station 820. Determination of whether a power control bit should take a value of one or zero is based on output from an inner loop comparator (discussed below).

Returning to FIG. 4, six winning Walsh symbol energy value's represent one power control group every 1.25 ms. Accumulation of six winning Walsh symbols is accomplished at accumulator 75, yielding a power control group metric 98 representative of an estimated Eb/No.

Power control group metric 98 is compared by an inner loop comparator 95 to output 93 from an outer loop set point controller 300. Outer loop set point controller 300 receives frame quality information 92, for example, frame erasure (FE) output, commonly referred to as hard frame quality information, from decoder 76, utilizing current methods. An outerloop setpoint threshold 93 (discussed below), output from outer loop set point controller 300, is updated every 20 ms to prevent significant variation in frame quality in an attempt to maintain consistent call quality of mobile station 816.

Figure 5:
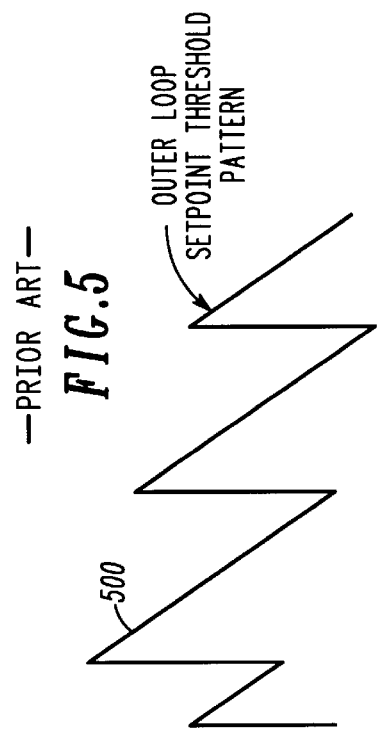
FIG. 5 is an illustration of a prior art outerloop setpoint threshold pattern generated by the apparatus for receiving the communication signal depicted in FIG. 4.

FIG. 5 shows a prior art sawtooth pattern 500 created by adjusting outerloop setpoint threshold 93 over time implemented in outer loop set point controller 300 as follows. An initial setpoint threshold is selected based on an expected nominal operating point corresponding to sensitivity of receiver 60 and changes with time, characterized by a fast attack-slow decay period. The decaying speed is determined by a required value for FER. Outer loop set point controller 300 reduces outerloop setpoint threshold 93 by a substantially small predetermined amount for each good full rate frame received until a frame erasure(s) occurs. When a frame erasure(s) occurs, the outerloop setpoint threshold 93 is increased up by some step size. The step size is predetermined and depends on whether the erasure is considered full rate frame or sub-rate frame. Over time, the resulting outerloop setpoint threshold 93 dynamically varies in the form of a large increase followed by many small decreases, consequently taking on the appearance of sawtooth pattern 500 depicted in FIG. 5.

In FIG. 4, outerloop setpoint threshold 93 is compared with power control group metric 98 at inner loop comparator 95, comparators being well known in the art. If the resulting value of an inner loop comparator output 94 is negative, then inner loop comparator 95 sends a power control bit of 1 to multiplexer 105, which when received by mobile station 816, lowers the transmission power of mobile station 816 by 1 dB. If the resulting value of comparator output 94 is positive, inner loop comparator 95 sends a power control bit of 0 to multiplexer 105, which when received by mobile station 816, raises the transmission power of mobile station 816 by 1 dB. Thus, the response of mobile station 816 to the PCB generated by receiver 60 in response to the power control group metric 98 composed of the winning Walsh symbol energy measured over a PCG and the FER of received communication signal R(T) 18, provides the feedback mechanism to adjust subsequent transmission power of mobile station 816.

While this prior art algorithm strives to insure that the threshold level does not contribute to long runs of frame errors, e.g. where mobile station 816 is not transmitting at a high enough power level, or is transmitting while undergoing fast changing conditions, the transmission power level of mobile station 816 may remain higher than necessary for lengthy periods of time, needlessly contributing to system noise.

Figure 6:
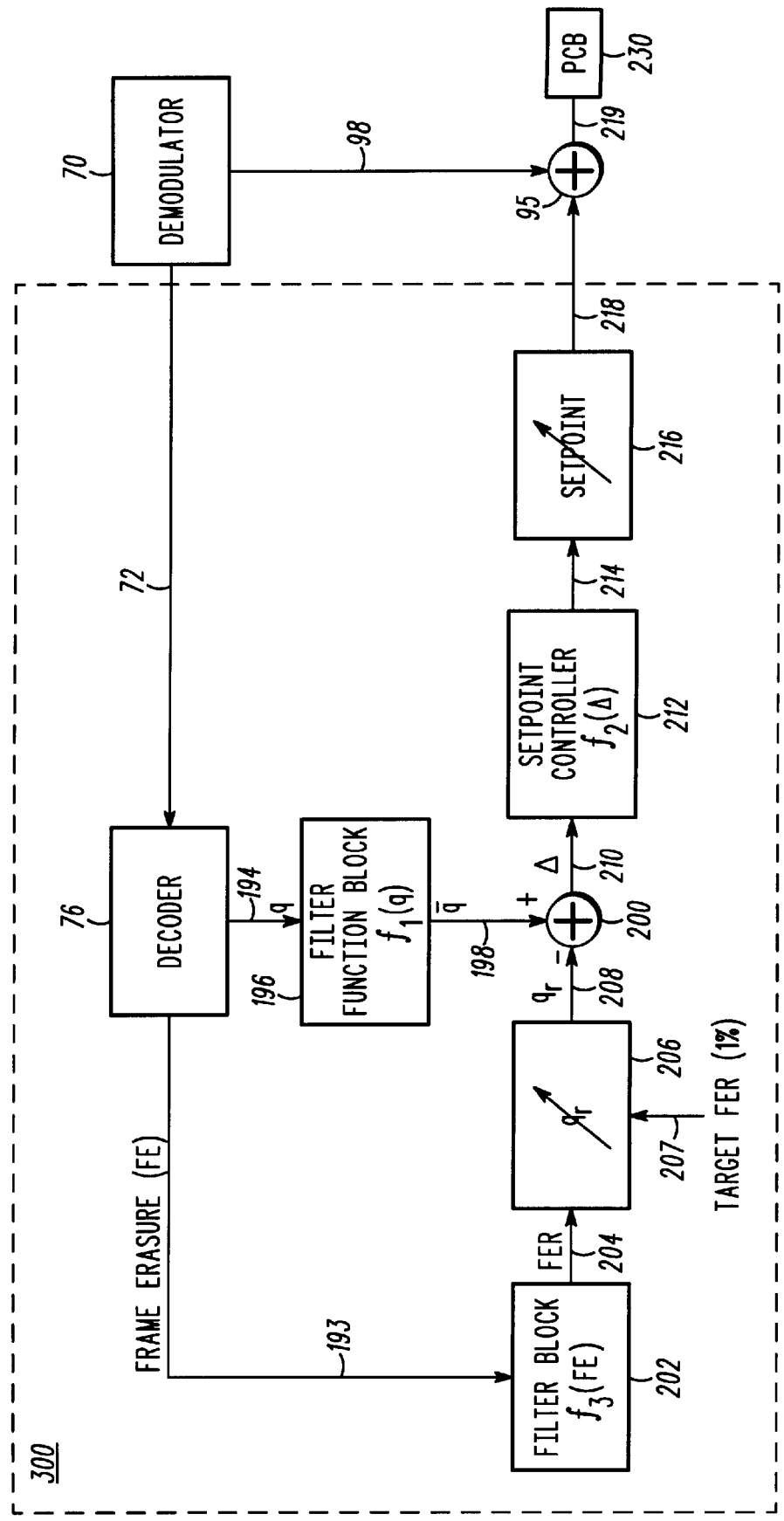
FIG. 6 is a block diagram of an outerloop setpoint controller, as shown in FIG. 4., in accordance with the present invention.

In a preferred embodiment of the present invention, FIG. 6 shows block diagram of an outerloop setpoint controller 300 as shown in FIG. 4., in accordance with the present invention. Decoder block 76 receives a communication signal such as received signal 72, from demodulator 70. In addition to generating a first signal quality indicator 193 such as frame erasure FE (discussed in connection with FIG. 4), decoder block 76 generates a second signal quality indicator 194, q, for example a symbol error rate, SER, commonly referred to as a soft frame quality indicator, for each frame.

Referring to FIG. 6, the output associated with first signal quality indicator 193, FE, is used to calculate an average frame erasure rate (FER) over a predetermined number of frames at filter block $f_3(FE)$ 202, yielding an average (FER) 204. Average FER 204 is used to adjust a second signal quality indicator reference 206, $q_r$. The adjustment is based on the difference between average FER 204, which is measured via filter block $f_3(FE)$ 202, and a target FER 207 which is predetermined, for example, 0.01.

The variable δ represents the difference between the estimated average time between erasures and the targeted time between erasures and may be represented by $\delta = FER^{-1} - 0.01^{-1}$.

If δ<0, $q_r$ is decreased by $\alpha_1 |FER^{-1} - 0.01^{-1}|^{\beta_1}$.

If δ>0, $q_r$ is increased by $\alpha_2 |FER^{-1} - 0.01^{-1}|^{\beta_2}$, where αs and βs (where s=1, 2) are predetermined constants. Consequently, the value of the second signal quality indicator reference 206, $q_r$, increases and decreases over time, depending on the FER estimated from first signal quality indicator 193 output from decoder 76.

Substantially concurrent to generating first signal quality indicator 193, decoder block 76 generates a second quality indicator 194, q. Second signal quality indicator 194 is input into filter function block 196, $f_1(q)$. An output $f_1(q)$ 198 representing a value based on averaged second signal quality indicators 194, averaged over the current and previous frames, is output from filter function block 196 and is input to comparator 200.

Comparator 200 compares the value of output $f_1(q)$ 198 with the value of $q_r$ at output 208, yielding comparator output Δ, 210. Comparator output 210 may be represented by the equation, $$\Delta = f_1(q) - q_r.$$

Comparator output Δ 210 is input to setpoint controller $f_2(\Delta)$ 212, yielding a setpoint controller $f_2(\Delta)$ output 214. If comparator output Δ 210 is smaller than a predetermined value 604 (discussed in connection with FIG. 7), σ, i.e., |Δ|<σ, then setpoint controller $f_2(\Delta)$ output 214=0, thus not varying a power control setpoint threshold 216. If comparator output 210 is higher than predetermined value 604, σ, i.e. Δ>σ, then setpoint controller $f_2(\Delta)$ output 214 causes a power control setpoint threshold 216 to be increased by $f_2(\Delta) = \kappa_1 \Delta$, where $\kappa_1$ is a predetermined constant, thus increasing power control setpoint threshold 216. If comparator output 210 is lower than predetermined value 604, σ, i.e., Δ<−σ, then setpoint controller $f_2(\Delta)$ output 214 causes power control setpoint threshold 216 to be decreased by $f_2(\Delta) = \kappa_2 \Delta$, where $\kappa_2$ is a predetermined constant, thus decreasing power control setpoint threshold 216.

In FIG. 7, predetermined value 604, σ is shown equidistant, above and below second signal quality indicator reference 206, forming a predetermined reference region 605, 2σ. As discussed in connection with FIG. 6, the value of second signal quality indicator reference 206, $q_r$, is variable over time, depending on the FER estimated by filter block $f_3(FE)$ 202, thereby adjusting second signal quality indicator reference 206, $q_r$, up or down. Output $f_1(q)$ 198 representing a value based on averaged second signal quality indicators 194, is also shown.

Thus, setpoint controller $f_2(\Delta)$ output 214 yields power control setpoint threshold 216 which is substantially smooth when compared to sawtooth pattern 500. FIG. 8 shows a comparison between an example of a pattern created generated by power control setpoint threshold 218, according to a preferred embodiment of the present invention, and a sawtooth pattern 500 generated according to prior art methods.

Filter block $f_3(FE)$ 202, filter function block $f_1(q)$ 196, and setpoint controller $f_2(\Delta)$ 212 may be implemented using a digital signal processor (DSP) or may be included as an application specific integrated circuit (ASIC) operation.

Returning to FIG. 6, power control setpoint threshold output 218 and power control group metric 98, which represents an estimated signal-to-noise ratio of a least one received winning walsh symbol or winning Walsh symbol energy measured over a PCG, are used to generate a power control command 219 which subsequently determines whether or not the value of PCB 230 is 1 or 0. Power control setpoint threshold 216 and power control group metric 98 are compared at inner loop comparator 95, resulting in power control command 219. If the resulting value of power control command 219 is negative, then inner loop comparator 95 sends a power control bit 230 value of 1 to multiplexer 105, which when received by mobile station 816 (FIG. 1), lowers the transmission power of mobile station 816 by 1 dB. If the resulting value of power control command 219 is positive, then inner loop comparator 95 sends a power control bit 230 value of 0 to multiplexer 105, which when received by mobile station 816, raises the transmission power of mobile station 816 by 1 dB. Thus, the response of mobile station 816 to the PCB generated by receiver 60 in response to the power control group metric 98 composed of the winning Walsh symbol energy measured over a PCG and first signal quality indicator 193, and second signal quality indicator 194 of received communication signal R(T) 18, provides the feedback mechanism to adjust subsequent transmission power of mobile station 816.

In an alternate embodiment, second signal quality indicator 194 may be selected to be a total metric (TM) or other soft quality indicators. In addition to generating a first signal quality indicator 193 such as frame erasure FE (discussed in connection with FIG. 4), decoder block 76 generates a second signal quality indicator 194, q, for example a total metric, TM, also referred to as a soft frame quality indicator, for each frame.

Referring again to FIG. 6, the output associated with first signal quality indicator 193, FE, is used to calculate an average FER over a predetermined number of frames at filter block $f_3(FE)$ 202, yielding an average frame erasure rate (FER) 204. Average FER 204 is used to adjust a second signal quality indicator reference 206, $q_r$. The adjustment is based on the difference between average FER 204, which is measured, and a target FER 207 which is predetermined, for example, 0.01.

The variable δ represents the difference between the estimated average time between erasures and the targeted time between erasures and may be represented as $\delta = \text{FER}^{-1} - 0.01^{-1}$.

If δ<0, $q_r$ is increased by $\alpha_1 |\text{FER}^{-1} - 0.01^{-1}|$.

If δ>0, $q_r$ is decreased by $\alpha_2 |\text{FER}^{-1} - 0.01^{-1}|^{\beta_2}$, where αs and βs (where s=1, 2) are predetermined constants. Consequently, the value of the second signal quality indicator reference 206, $q_r$, increases and decreases over time, depending on the FER estimated first signal quality indicator 193 output from decoder 76.

Substantially concurrent to generating first signal quality indicator 193, decoder block 76 generates a second quality indicator 194, q. Second signal quality indicator 194 is input into filter function block 196, $f_1(q)$. An output $f_1(q)$ 198 representing a value based on averaged second signal quality indicators 194, averaged over the current and previous frames, is output from filter function block 196 and is input to comparator 200.

Comparator 200 compares the value of output $f_1(q)$ 198 with the value of $q_r$ at output 208, yielding comparator output Δ, 210. Comparator output 210 may be represented by the equation, $$\Delta = f_1(q) - q_r.$$

Comparator output Δ 210 is input to setpoint controller $f_2(\Delta)$ 212, yielding a setpoint controller $f_2(\Delta)$ output 214. If comparator output Δ 210 is smaller than a predetermined value 604 (discussed in connection with FIG. 7), σ, i.e., |Δ|<σ, then setpoint controller $f_2(\Delta)$ output 214=0, thus not varying a power control setpoint threshold 216. If comparator output 210 is higher than predetermined value 604, σ, i.e. Δ>σ, then setpoint controller $f_2(\Delta)$ output 214 causes a power control setpoint threshold 216 to be decreased by $f_2(\Delta) = \kappa_1 \Delta$, where $\kappa_1$ is a predetermined constant, thus decreasing power control setpoint threshold 216. If comparator output 210 is lower than predetermined value 604, σ, i.e., Δ<−σ, then setpoint controller $f_2(\Delta)$ output 214 causes power control setpoint threshold 216 to be increased by $f_2(\Delta) = \kappa_2 \Delta$, where $\kappa_2$ is a predetermined constant, thus increasing power control setpoint threshold 216.

It is contemplated that, although outerloop setpoint controller 300 is shown to be collocated with receiver 60 (FIG. 4), located at base station 812, outerloop setpoint controller 300 may also reside in a centralized controller, for example BSC 850. Consequently, first signal indicator 193 and second signal indicator 194 output from decoder 76 may be transferred to outerloop setpoint controller 300 at BSC 850, and processed to yield power control command 219.

In addition, decoder 76 may reside in a centralized controller such as BSC 850. Consequently, power control setpoint threshold 216 calculated using first signal indicator 193 and second signal indicator 194, may be transferred to base station 812. Subsequent to transferring power control setpoint threshold 216 to base station 812, power control command 219 may be generated according to methods described in connection with FIG. 6.

In any of the above cases, a plurality of received communication signals R(T) 18 associated with mobile station 816 will result in a plurality of demodulated, decoded signals due to multiple decoders such as decoder 76, and subsequently a plurality of first signal quality indicators and second quality indicators. Outerloop setpoint controller 300 will select from the plurality of signal quality indicators, a first signal quality indicators 193 and second quality indicators 194 having the highest weighted and summed quality values.

The IS-95A reverse link channel has been specifically referred to herein, but the present invention is applicable to any digital channel, including but not limited to the forward link IS-95A channel and to all forward- and reverse-link TDMA channels, in all TDMA systems such as Groupe Special Mobile (GSM), a European TDMA system, Pacific Digital Cellular (PDC), a Japanese TDMA system, and Interim Standard 54 (IS-54), a U.S. TDMA system.

The principles of the present invention which apply to a cellular-based digital communication systems, including but not limited to personal communicating systems, trunked systems, satellite systems and data networks. Likewise, the principles of the present invention which apply to all types of digital radio frequency channels also apply to other types of communication channels, such as radio frequency signaling channels, electronic data buses, wireline channels, optical fiber links and satellite links.

It will furthermore be apparent that other forms of the invention, and embodiments other than the specific embodiments described above, may be devised without departing from the spirit and scope of the appended claims and their equivalents. For example, two methods utilizing so called soft frame quality indicators are described herein.

What we claim is:

1. In a code division multiple access wireless communication system, the system including a mobile communication unit, a method of adjusting a power control setpoint threshold, comprising the steps of:
   receiving a communication signal from the mobile communication unit to form a received communication signal;
   generating a first signal quality indicator based on the received communication signal;
   generating a second signal quality indicator based on the received communication signal;
   generating, an estimated signal-to-noise ratio;
   setting a predetermined reference region centered around the second signal quality indicator reference where the second signal quality indicator reference is related to the first signal quality indicator; and
   adjusting the power control setpoint threshold based on a comparison between the second quality indicator and the predetermined reference region.

2. The method according to claim 1, wherein the first signal quality indicator comprises frame erasure information.

3. The method according to claim 2, wherein the second signal quality indicator reference about which the reference region is centered, is variable based on a characteristic of the frame erasure information.

4. The method according to claim 3, wherein the characteristic of the frame erasure information further comprises a frame erasure rate.

5. The method according to claim 1, wherein the second quality indicator is selected from a group consisting of a symbol error rate indicator, a total metric and other quality indicators.

6. The method according to claim 1, wherein a power control command is generated based on the power control setpoint threshold and the estimated signal-to-noise ratio of at least one received symbol.

7. The method according to claim 1, wherein a power control command is generated based on the power control setpoint threshold and the estimated signal-to-noise ratio of symbols within a power control group.

8. The method according to claim 1, wherein the estimated signal-to-noise ratio is generated by a demodulator.

9. The method according to claim 1, wherein the first and second quality indicator is selected from amongst a plurality of such indicators obtained from a plurality of demodulated communication signals.

10. The method according to claim 9, wherein the first and second quality indicator is selected based on the best combined and weighted quality value.

11. The method according to claim 1, wherein the first signal quality indicator and the second signal quality indicator are generated at a base station.

12. The method according to claim 11, wherein the step of adjusting the power control setpoint threshold is performed at the base station.

13. The method according to claim 11, wherein the first signal quality indicator and the second signal quality indicator are transferred from the base station to a centralized controller.

14. The method according to claim 13, wherein the step of adjusting the power control setpoint threshold is performed at the centralized controller.

15. The method according to claim 14, wherein the power control setpoint threshold is transferred to the base station to generate the power control command.

16. The method according to claim 1, wherein the first signal quality indicator and the second signal quality indicator are generated from a decoder.

17. The method according to claim 16, wherein the decoder resides in either a base station or a centralized controller.

18. The method of claim 17, wherein the step of adjusting the power control setpoint threshold is performed at the base station, if the decoder resides in the base station.

19. The method of claim 17, wherein the step of adjusting the power control setpoint threshold is performed at the centralized controller, if the decoder resides in the centralized controller.

20. The method according to claim 19, further comprising the steps of:

transferring, by the centralized controller, the power control setpoint threshold to the base station; and generating, at the base station, the power control command.

21. The method according to claim 19, further comprising the steps of:

generating, at the centralized controller, the power control command; and transferring the power control command to the base station.

22. A controller responsive to a decoder comprising:

means for receiving a first signal quality indicator based on a decoded received communication signal;

means for receiving a second signal quality indicator based on the decoded received communication signal;

means for generating a second signal quality indicator reference where the second signal quality indicator reference is related to the first signal quality indicator;

means for setting a predetermined reference region centered around the second signal quality indicator reference; and means for adjusting a power control setpoint threshold based on a comparison between the second signal quality indicator and the predetermined reference region.

* * * * *